(12) United States Patent
Hongo

(10) Patent No.: US 7,974,444 B2
(45) Date of Patent: Jul. 5, 2011

(54) IMAGE PROCESSOR AND VEHICLE SURROUNDING VISUAL FIELD SUPPORT DEVICE

(75) Inventor: Hitoshi Hongo, Shijonawate (JP)

(73) Assignee: Sanyo Electric Co., Ltd., Osaka (JP)

( * ) Notice: Subject to any disclaimer, the term of this patent is extended or adjusted under 35 U.S.C. 154(b) by 987 days.

(21) Appl. No.: 11/842,599

(22) Filed: Aug. 21, 2007

(65) Prior Publication Data
US 2008/0044061 A1 Feb. 21, 2008

(30) Foreign Application Priority Data

Aug. 21, 2006 (JP) ................................ 2006-224444
Jun. 15, 2007 (JP) ................................ 2007-158802

(51) Int. Cl.
*G06K 9/00* (2006.01)
*G06K 9/32* (2006.01)
*G06K 9/30* (2006.01)

(52) U.S. Cl. ......... 382/104; 382/284; 382/312; 280/656

(58) Field of Classification Search .................. 382/104, 382/276, 294–296, 312, 284; 348/143, 148, 348/36, 207.99; 280/426, 656; 340/435, 340/426.17, 426.33; 359/841; 345/629
See application file for complete search history.

(56) References Cited

U.S. PATENT DOCUMENTS

| | | | | |
|---|---|---|---|---|
| 4,277,804 A | * | 7/1981 | Robison | 348/148 |
| 5,196,965 A | * | 3/1993 | Lang et al. | 359/841 |
| 5,917,405 A | * | 6/1999 | Joao | 340/426.17 |
| 6,450,523 B1 | * | 9/2002 | Masters et al. | 280/426 |
| 6,891,563 B2 | * | 5/2005 | Schofield et al. | 348/148 |
| 7,378,947 B2 | * | 5/2008 | Daura Luna et al. | 340/435 |

FOREIGN PATENT DOCUMENTS

| | | |
|---|---|---|
| JP | 7-13588 | 3/1995 |
| JP | 7-13588 U | 3/1995 |
| JP | 200-331151 | 11/2000 |
| JP | 2001-184484 | 7/2001 |
| JP | 2002-46533 | 2/2002 |
| JP | 2002-46533 A | 2/2002 |
| JP | 2002-120775 | 4/2002 |
| JP | 2002-181518 | 6/2002 |
| JP | 2003-235036 A | 8/2003 |
| JP | 2004-46573 | 2/2004 |

OTHER PUBLICATIONS

English Translation of Chinese Office Action for corresponding CN Application No. 200710140078.3, dated Mar. 18, 2010, pp. 1-16.
Chinese Office Action for corresponding CN Application No. 200710140078.3, dated Mar. 18, 2010, pp. 1-11 China. Partial English translation included.

* cited by examiner

*Primary Examiner* — Kanji Patel
(74) *Attorney, Agent, or Firm* — Ditthavong Mori & Steiner, P.C.

(57) ABSTRACT

One camera having a horizontally wide view angle is installed at each of the left and right rear ends of a tractor. The visual field of the left camera includes the road surface located to the left side of the tractor and a trailer, and the like. The visual field of the right camera includes the road surface located to the right side of the tractor and the trailer, and the like. The left and right cameras have a common visual field at the rear side of the trailer. A panorama image obtained by synthesizing images respectively obtained by the left and right cameras is displayed on a display device located in the interior of the tractor.

21 Claims, 21 Drawing Sheets

FIG.8A                    FIG.8B
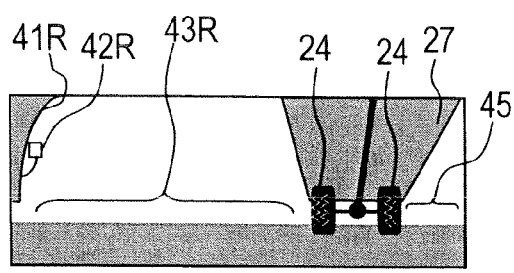
RIGHT PANORAMA IMAGE
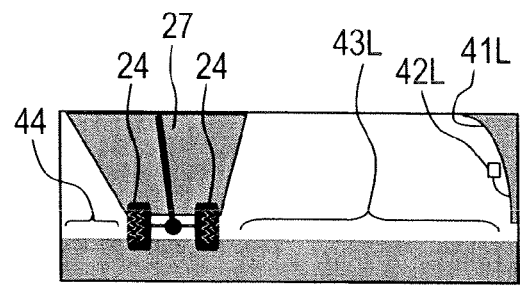
LEFT PANORAMA IMAGE

ACTUAL SPACE RIGHT SIDE ←——— WIDE PANORAMA IMAGE ———→ ACTUAL SPACE LEFT SIDE 90 60 30 0 -30 -60 -90 (DEGREES)

ACTUAL SPACE LEFT SIDE ←——— DISPLAY IMAGE ———→ ACTUAL SPACE RIGHT SIDE

RIGHT PANORAMA IMAGE

LEFT PANORAMA IMAGE

RIGHT PANORAMA IMAGE

LEFT PANORAMA IMAGE

ACTUAL SPACE RIGHT SIDE ←——— WIDE PANORAMA IMAGE ———→ ACTUAL SPACE LEFT SIDE

ACTUAL SPACE RIGHT SIDE ←——— WIDE PANORAMA IMAGE ———→ ACTUAL SPACE LEFT SIDE

FIG.16A
FIG.16B
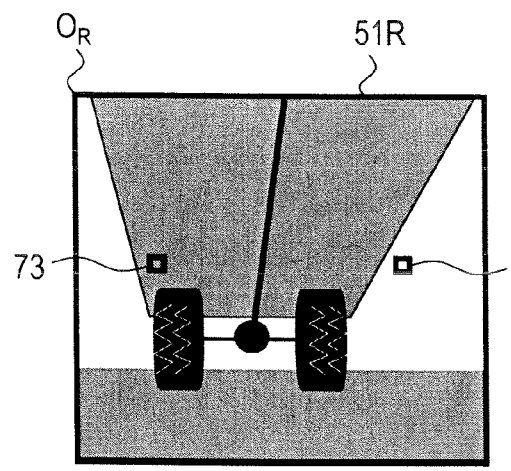
RIGHT PANORAMA IMAGE
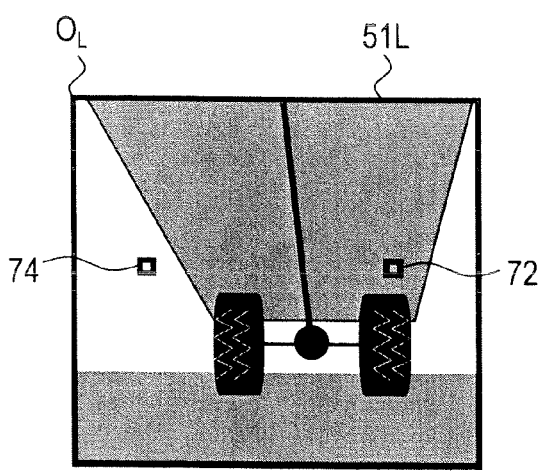
LEFT PANORAMA IMAGE

RIGHT PANORAMA IMAGE

LEFT PANORAMA IMAGE

RIGHT PANORAMA IMAGE

LEFT PANORAMA IMAGE

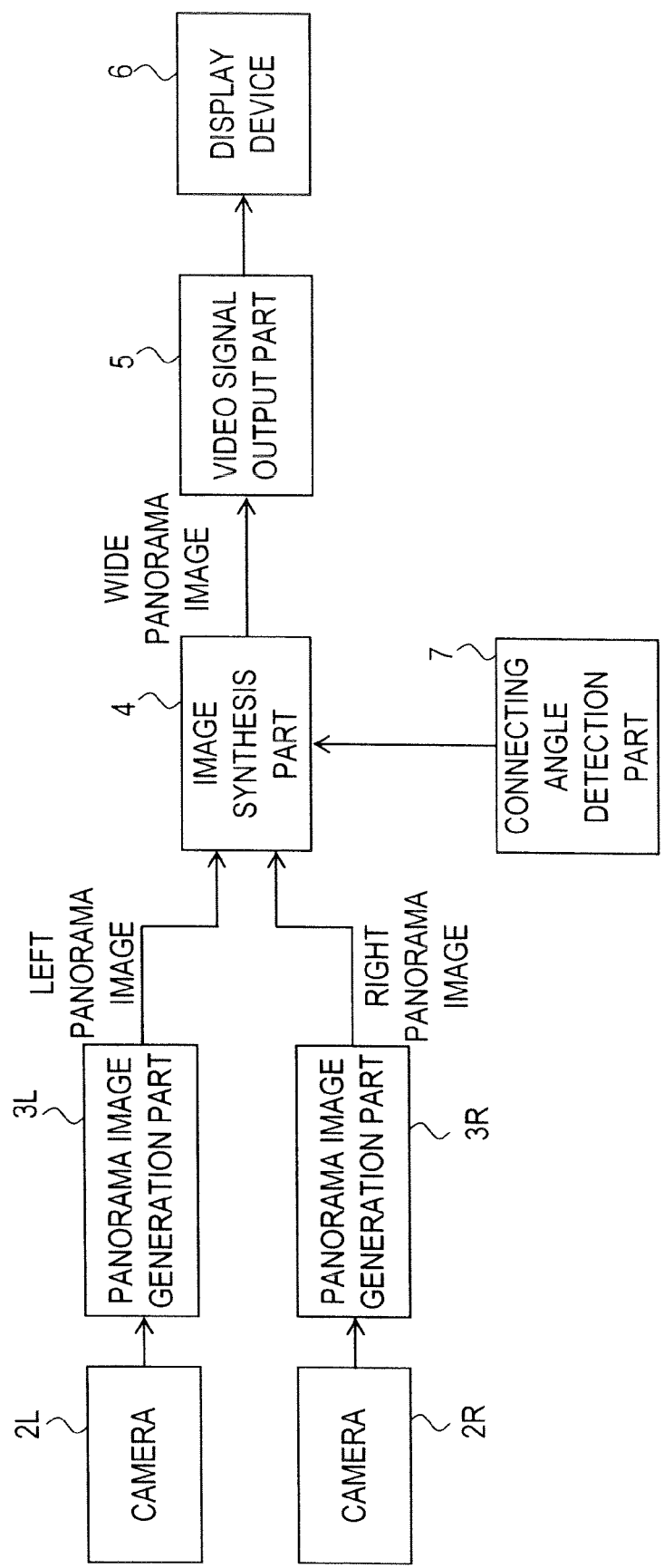

RIGHT PANORAMA IMAGE

LEFT PANORAMA IMAGE

FIG.25A
FIG.25B
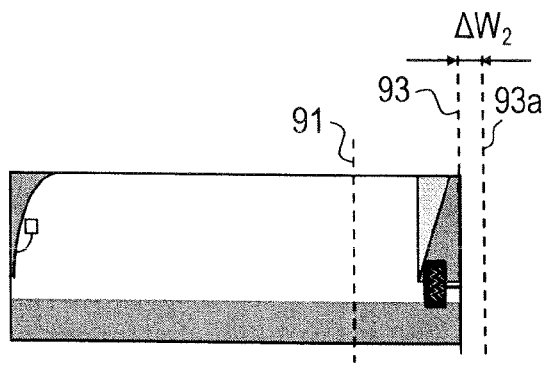
RIGHT PANORAMA IMAGE
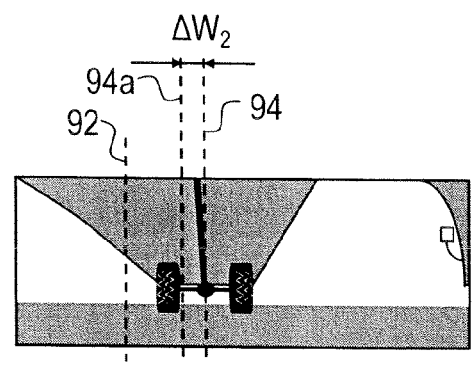
LEFT PANORAMA IMAGE

IMAGE PROCESSOR AND VEHICLE SURROUNDING VISUAL FIELD SUPPORT DEVICE

This nonprovisional application claims priority under 35 U.S.C. §119(a) on Patent Application No. 2006-224444 filed in Japan on Aug. 21, 2006 and Patent Application No. 2007-158802 filed in Japan on Jun. 15, 2007, the entire contents of which are hereby incorporated by reference.

BACKGROUND OF THE INVENTION

1. Field of the Invention

The present invention relates to a vehicle surrounding visual field support device and method, and more particularly to a vehicle surrounding visual field support device and method for displaying an image representing a surrounding visual field of a connected vehicle composed of a tractor and a trailer on a display device included in the interior of the tractor. The invention also relates to an image processor for use in the vehicle surrounding visual field support device.

2. Description of Related Art

In a connected vehicle composed of a tractor and a trailer pulled by the tractor, the tractor and the trailer bend at a connecting section at the time of vehicle body turning, with the bending angle (connecting angle) varying every moment in accordance with the turning condition.

Operating a connected vehicle of this type is relatively difficult. For example, to move the connected vehicle backward while turning it rightward, it is required to perform driving operation of first steering leftward to obtain some connecting angle and then steering rightward. In this manner, the driver is required to turn the vehicle while recognizing the connecting angle and at the same time check the security of the surrounding. However, in a connected vehicle of this type, a dead zone is large and varies with turning, which makes it difficult for even an experienced driver to reliably recognize the connecting angle and check the security, thus imposing great loads on him or her. Technologies for reducing these loads are important.

As technologies for supporting the visual field of a connected vehicle of this type, there are some conventional technologies. For example, with the first conventional technology, cameras are installed at the left and right rear ends of a trailer and the camera at the rear end opposite to the trailer bending direction is turned in accordance with the trailer bending angle to photograph a trailer side that becomes dead space. Then a predicted path line is displayed in superimposition on a video obtained by this photographing.

For example, with the second conventional technique, cameras capable of controlling the camera direction are installed at the left and right rear ends of a tractor to control the camera direction in accordance with the trailer bending angle.

A large number of methods of detecting the trailer connecting angle have also been proposed. There have already been disclosed technologies related to image synthesis processing of synthesizing a plurality of images to generate a panorama image. Moreover, technologies related to cylindrical surface projection conversion processing considering the camera tilt angle have been disclosed already.

SUMMARY OF THE INVENTION

A first image processor according to the present invention receives photographing signals from a first photographing part and a second photographing part installed at a first vehicle and having a common visual field in a direction of a second vehicle connected to the first vehicle. The image processor includes: an image synthesizer generating a synthetic image obtained by synthesizing a first image based on the photographing signal from the first photographing part and a second image based on the photographing signal from the second photographing part; and a video signal output part outputting a video signal for displaying on a display device a display image based on the synthetic image.

A second image processor according to the invention receives photographing signals from a first photographing part and a second photographing part installed at a first vehicle and having a common visual field in a direction of a second vehicle connected to the first vehicle, and also receives a photographing signal from a third photographing part that photographs rear of the second vehicle. The image processor includes: an image synthesizer reflecting a third image based on the photographing signal from the third photographing part on an image portion of the second vehicle in a synthetic image obtained by synthesizing a first image based on the photographing signal from the first photographing part and a second image based on the photographing signal from the second photographing part and further synthesizing the synthetic image with the third image to thereby generate a multiple synthetic image; and a video signal output part outputting a video signal for displaying on a display device a display image based on the multiple synthetic image.

Specifically, for example, when the first and second vehicles lie on a straight line, the first photographing part and the second photographing part may be installed at the first vehicle so that a left side of the second vehicle and a wheel or tire of the second vehicle fall in a visual field of the first photographing part and also so that a right side of the second vehicle and the wheel or tire of the second vehicle fall in a visual field of the second photographing part. At least the wheel or tire of the second vehicle may be included in the common visual field. The image synthesizer may generate in the synthetic image at least an image of the wheel or tire of the second vehicle as a partial image corresponding to the common visual field.

For example, the image synthesizer may compare luminance of each pixel in an image region corresponding to the common visual field in the first image and luminance of each pixel in an image region corresponding to the common visual field in the second image, and may generate a partial image corresponding to the common visual field in the synthetic image by using a pixel signal of the pixel with the larger luminance.

The image synthesizer may include a portion detector detecting a position of a particular portion of the second vehicle on the first and second images, and may synthesize the first and second images based on a result of the detection made by the portion detector.

For example, a connecting angle detector for detecting a connecting angle formed by the first and second vehicles may be further included, and the image synthesizer may synthesize the first and second images based on the detected connecting angle.

A first vehicle surrounding visual field support device according to the invention includes: the first image processor described above, and at least one of a photographing unit having the first and second photographing parts, and the display device.

A second vehicle surrounding visual field support device according to the invention includes: the second image processor described above, at least one of a photographing unit having the first, second, and third photographing parts, and the display device.

A first vehicle according to the invention includes a first vehicle and a second vehicle connected to the first vehicle. In the first vehicle, the image processor described above and the first and second photographing parts are installed.

A second vehicle according to the invention includes a first vehicle and a second vehicle connected to the first vehicle. In the second vehicle, the image processor described above, and the first, second, and third photographing parts are installed.

A first vehicle surrounding visual field support method according to the invention receives photographing signals from a first photographing part and a second photographing part installed at a first vehicle and having a common visual field in a direction of a second vehicle connected to the first vehicle, synthesizes a first image based on the photographing signal from the first photographing part and a second image based on the photographing signal from the second photographing part to thereby generate a synthetic image, and displays on a display device a display image based on the synthetic image.

A second vehicle surrounding visual field support method according to the invention receives photographing signals from a first photographing part and a second photographing part installed at a first vehicle and having a common visual field in a direction of a second vehicle connected to the first vehicle, and also receiving a photographing signal from a third photographing part that photographs rear of the second vehicle, reflects a third image based on the photographing signal from the third photographing part on an image portion of the second vehicle in a synthetic image obtained by synthesizing a first image based on the photographing signal from the first photographing part and a second image based on the photographing signal from the second photographing part and further synthesizing the synthetic image with the third image to thereby generate a multiple synthetic image, and displays on a display device a display image based on the multiple synthetic image.

BRIEF DESCRIPTION OF THE DRAWINGS

FIG. 8A is a diagram showing an example of a right panorama image generated through photographing by the camera of FIG. 1 for explaining a road surface and the like appearing in the right panorama image;

FIG. 8B is a diagram showing an example of a left panorama image generated through photographing by the camera of FIG. 1 for explaining a road surface and the like appearing in the left panorama image;

FIG. 16A is a diagram showing a right panorama image as an image subjected to synthesis in the first synthesis method;

FIG. 16B is a diagram showing a left panorama image as an image subjected to synthesis in the first synthesis method;

FIG. 17 is a diagram for explaining the first synthesis method of synthesizing right and left panorama images, showing an pixel array of the image subjected to synthesis in the first synthesis method or the like;

FIG. 23 is, as a modified example of the overall block diagram of FIG. 1, an overall block diagram of a vehicle surrounding visual field support device when a third synthesis method of synthesizing a right and a left panorama images for a wide panorama image is adopted;

FIG. 25A is a diagram for explaining the third synthesis method according to the embodiment of the invention, showing one example of a right panorama image generated through photographing by the camera of FIG. 1 (when the connecting angle is 60°);

FIG. 25B is a diagram for explaining the third synthesis method according to the embodiment of the invention, showing one example of a left panorama image generated through photographing by the camera of FIG. 1 (when the connecting angle is 60°);

DETAILED DESCRIPTION OF PREFERRED EMBODIMENTS

Hereinafter, the embodiment of the present invention will be described in detail with reference to the accompanying drawings. In the figures referenced, the same portions are numbered with the same numerals and thus their overlapping description will be basically omitted.

Figure 1:
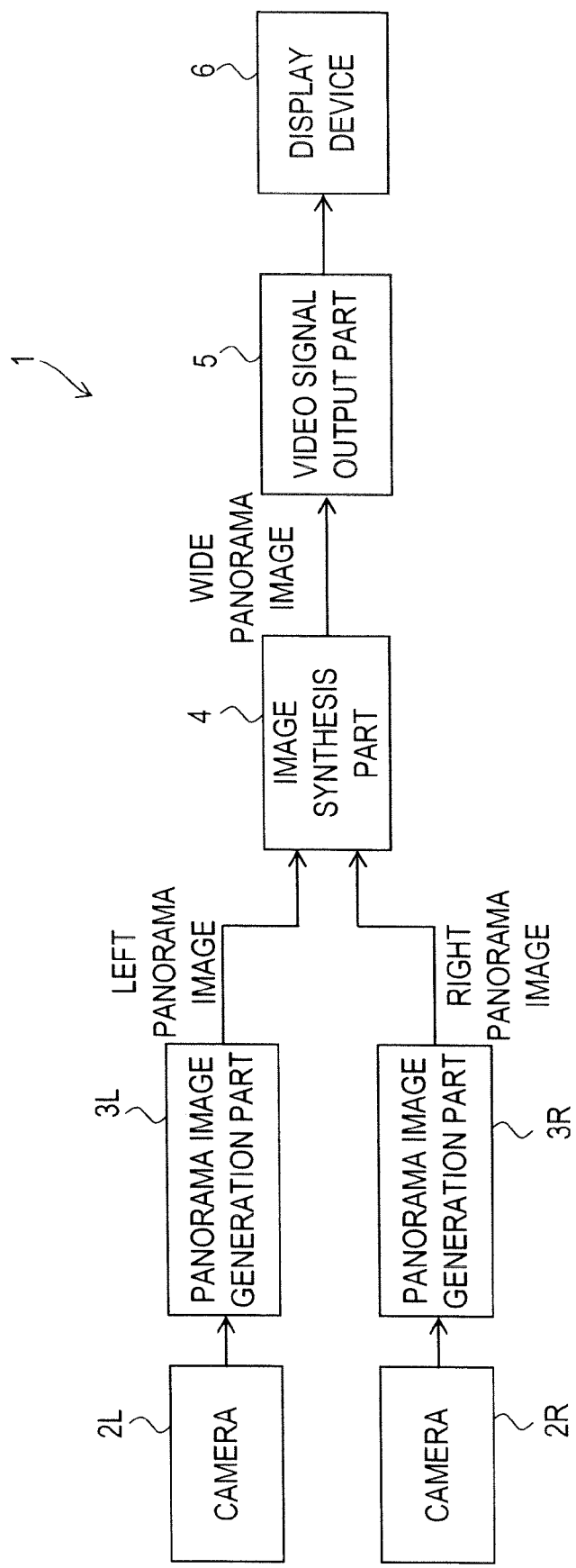
FIG. 1 is an overall block diagram of a vehicle surrounding visual field support device according to an embodiment of the present invention.

FIG. 1 is an overall configuration block diagram of a vehicle surrounding visual field support device (hereinafter abbreviated as "visual field support device") 1 according to the embodiment of the invention. The visual field support device 1 includes cameras 2L and 2R, panorama image generation parts 3L and 3R, an image synthesis part 4, a video signal output part 5, and a display device 6.

Figure 2:
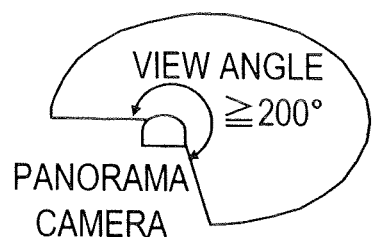
FIG. 2 is a diagram showing a view angle of cameras of FIG. 1.

Each of the cameras 2L and 2R is a so-called panorama camera, and has a view angle of 200° or more as shown in FIG. 2. Each of the cameras 2L and 2R is formed by, for example, combining together a plurality of generally widespread wide-angle cameras having an angle of field of 100° to 140°.

Figure 3:
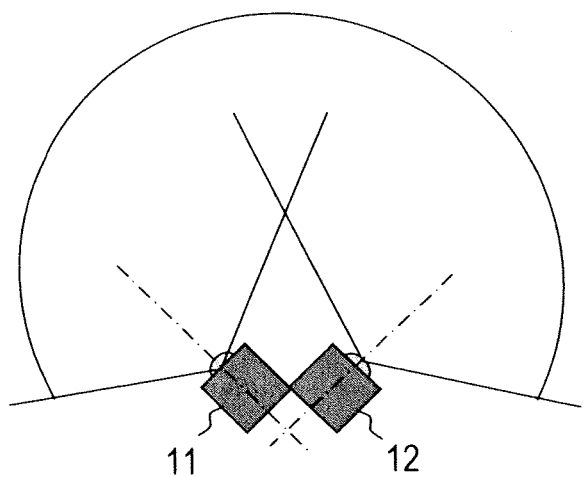
FIG. 3 is a diagram showing a configuration example of the cameras of FIG. 1.

FIG. 3 shows a configuration example of the camera 2L. The camera 2L is formed with wide-angle cameras 11 and 12 having an angle of field of 100° to 140°. The wide-angle cameras 11 and 12 individually perform photographing, and photographing signals representing images respectively obtained through the photographing by the wide-angle cameras 11 and 12 are transmitted to the panorama image generation part 3L of FIG. 1. The wide-angle cameras 11 and 12 are arranged with mutually different horizontal visual fields which partially overlap each other.

The panorama image generation part 3L synthesizes images respectively obtained from the wide-angle cameras 11 and 12 to thereby generate a panorama image. As a method of synthesizing images to generate a panorama image, a well-known technology as described in JP-A-2000-331151 and JP-A-2001-184484 may be used. As shown in FIG. 3, arranging wide-angle cameras (in this case, wide-angle cameras 11 and 12) forming the camera 2L horizontally side by side with their respective optical axes intersecting each other at one point facilitates the synthesis for a panorama image and also permits providing the camera 2L with a horizontal view angle of 200° or more. The camera 2L is formed with the two wide-angle cameras in the example shown in FIG. 3, but the camera 2L may be formed with three or more cameras.

Configuration and function of the camera 2R and the panorama image generation part 3R are the same as those of the camera 2L and the panorama image generation part 3L. Specifically, the camera 2R is formed with, for example, a plurality of cameras such as the wide-angle cameras 11 and 12, and photographing signals representing images respectively obtained through photographing by the plurality of cameras are transmitted to the panorama image generation part 3R. The panorama image generation part 3R synthesizes the images respectively obtained from the plurality of cameras to thereby generate a panorama image.

The cameras 2L and 2R may be each formed with one camera, although this results in complicated lens design and structure. In a case where the cameras 2L and 2R are each formed with one camera, it is difficult at present to ensure a view angle of 200° or more, in which case the view angle is set less than 200° as appropriate.

Hereinafter, a panorama image generated in the panorama image generation part 3L is referred to as a left panorama image and a panorama image generated in the panorama image generation part 3R is referred to as a right panorama image. In FIG. 1, the image synthesis part 4 synthesizes the left panorama image and the right panorama image. An image obtained through this synthesis is referred to as a wide panorama image. A method of synthesis for this wide panorama image will be described later. A signal representing the wide panorama image is transmitted to the video signal output part 5. The video signal output part 5, based on the signal from the image synthesis part 4, generates a video signal and transmits the video signal to the display device 6 so that a display image based on the wide panorama image is displayed on the display screen of the display device 6.

The display device 6 is formed of a liquid crystal display panel or the like, and displays the display image described above on the display screen. The display device 6 is installed inside the tractor 21 so that a driver of the tractor 21 can view the display image displayed by the display device 6. A display device included in a car navigation system or the like may be used as the display device 6 in the visual field support device 1.

Figure 4:
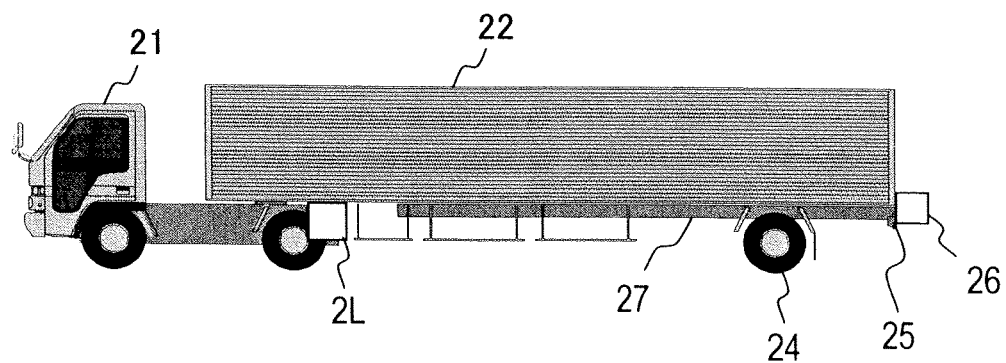
FIG. 4 is a side external appearance diagram of a tractor and a trailer pulled by the tractor, to which the vehicle surrounding visual field support device of FIG. 1 is fitted.

The visual field support device 1 is used while fitted to the vehicle. FIG. 4 is a side external appearance diagram of a vehicle fitted with the visual field support device 1. Numeral 21 denotes a tractor. Numeral 22 denotes a trailer connected to and pulled by the tractor 21. Numeral 24 denotes a tire provided in the trailer 22. Typically, the tire 24 is referred to as a rear wheel of the trailer 22. Numeral 25 denotes a rear end of the trailer 22. Numeral 26 denotes a rear camera installed at the rear end 25 to photograph the rear of the trailer 22. Numeral 27 denotes a bottom surface of the trailer 22 on which the tire 24 is provided.

The rear camera 26 can be included in components of the visual field support device 1. How an image photographed by the rear camera 26 is used in this case will be descried later.

In this specification, it is defined that the tractor 21 side as viewed from the trailer 22 side is "front" and the trailer 22 side as viewed from the tractor 21 side is "rear". In addition, needless to say, a direction orthogonal to a front-rear direction is a left-right direction.

Figure 5:
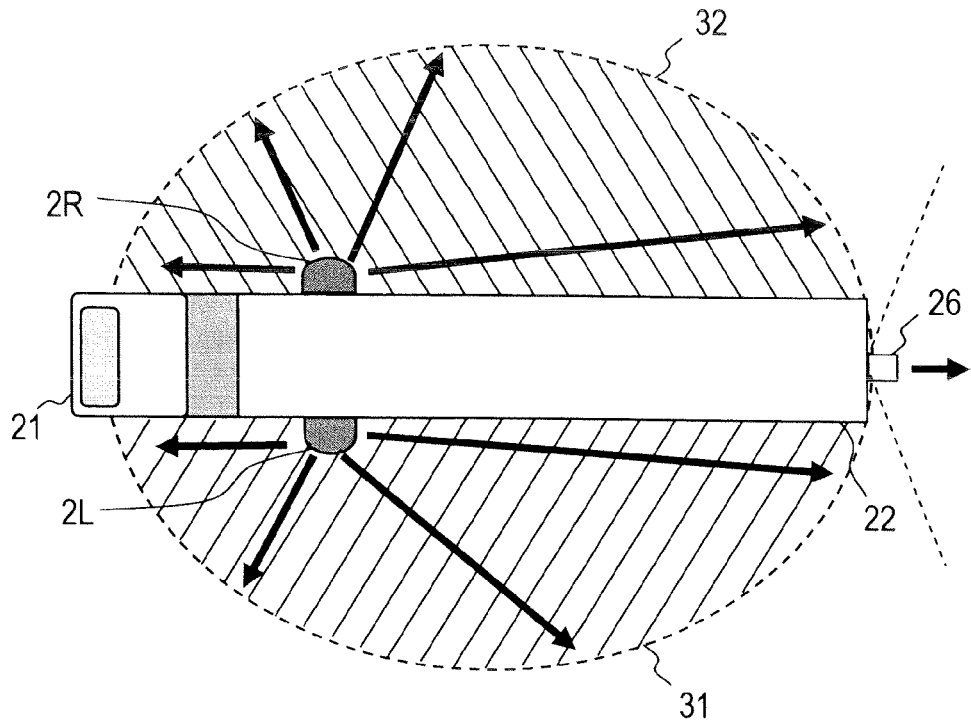
FIG. 5 is a diagram of the tractor and trailer of FIG. 4 as viewed from the above (when the connecting angle is 0°)
Figure 6:
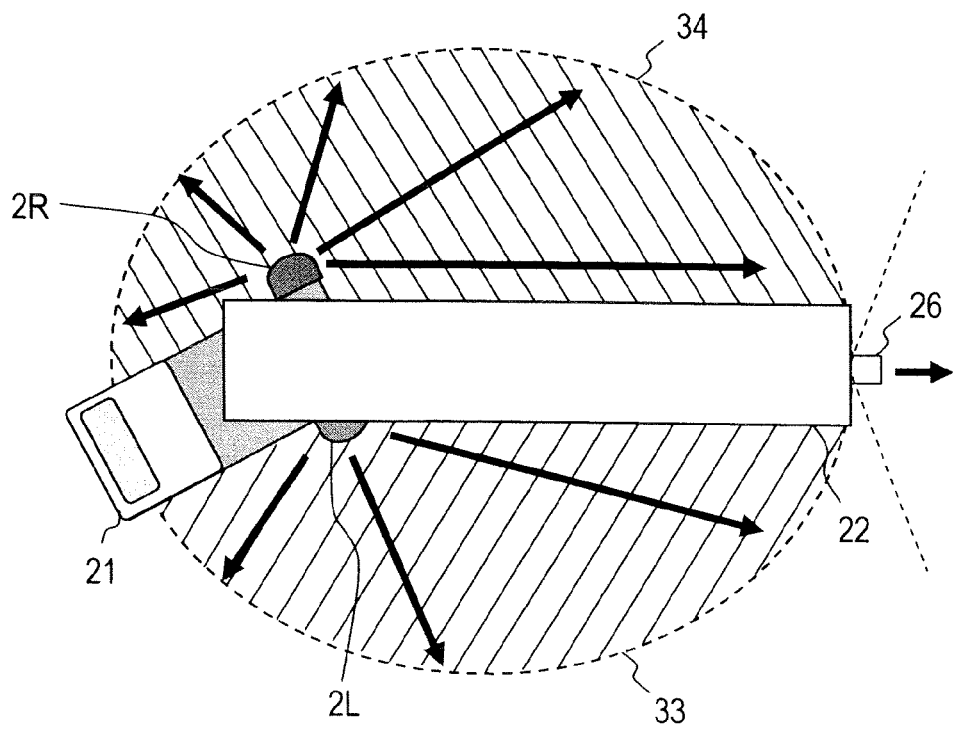
FIG. 6 is a diagram of the tractor and trailer of FIG. 4 as viewed from the above (when the connecting angle is not 0°)

FIGS. 5 and 6 are diagrams of the tractor and the trailer as viewed from the above.

Figure 7:
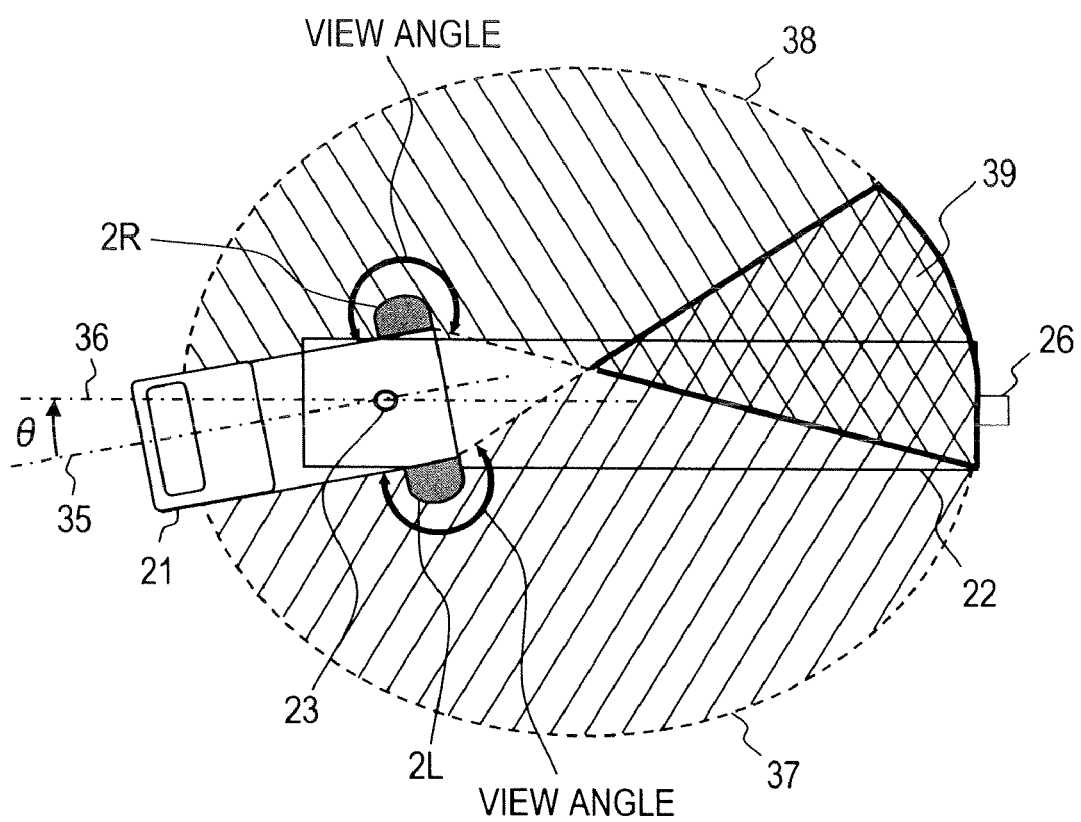
FIG. 7 is a diagram of the tractor and trailer of FIG. 4 as viewed from the above, explaining relationship between the connecting angle formed by the tractor and trailer and visual fields of the two cameras shown in FIG. 1.

FIG. 5 shows a case where an angle (hereinafter referred to as "connecting angle) formed by the tractor 21 and the trailer 22 is 0°. FIG. 6 shows a case where the connecting angle is not 0°. FIG. 7 is a perspective top view of the tractor 21 and the trailer 22 as viewed from the above. When the connecting angle is 0°, the tractor 21 and the trailer 22 are arranged on a straight line (bodies of the tractor 21 and the trailer 22 are arranged on a straight line).

In FIG. 7, numeral 23 denotes a connecting section. The trailer 22 is connected at the connecting section 23 to the tractor 21. The trailer 22 bends relative to the tractor 21, with the connecting section 23 as a supporting point. On a two-dimensional plane where the tractor 21 and the trailer 22 are projected on a horizontal plane, an angle formed by a center line 35 of the tractor 21 and a center line 36 of the trailer 22 corresponds to the connecting angle described above. In FIG. 7, the connecting angle is expressed by θ. Viewing the tractor 21 and the trailer 22 from the above, the connecting angle θ is positive when the trailer 22 bends clockwise with the connecting section 23 as a supporting point. Therefore, the connecting angle θ is positive when the tractor 21 and the trailer 22 attempt to make a left turn from straightforward moving state.

The camera 2L is installed on the left side of the rear end of the tractor 21. The camera 2R is installed on the right side of the rear end of the tractor 21. In FIG. 4, the camera 2R is hidden behind the camera 2L, and thus not shown. The cameras 2L and 2R are installed at relatively low position of the tractor 21 so that they can photograph the tires 24 and the bottom surface 27.

In a case where the connecting angle is as shown in FIG. 5, the visual field (photographing region) of the camera 2L includes a semi-oval shaded region 31 and the visual field of the camera 2R includes a semi-oval shaded region 32. In this case, the camera 2L photographs a subject inside the visual field including the shaded region 31, and the camera 2R photographs a subject inside the visual field including the shaded region 32. The shaded region 31 is located on the left side of the tractor 21 and the trailer 22. The shaded region 32 is located on the right side of the tractor 21 and the trailer 22. Arrows in the shaded area 31 denote a direction in which the visual field of the camera 2L widens. Arrows in the shaded region 32 denote a direction in which the visual field of the camera 2R widens.

In a case where the connecting angle is as shown in FIG. 6, the visual field (photographing region) of the camera 2L includes a shaded region 33 having a modified fan-like shape, and the visual field (photographing region) of the camera 2R includes a shaded region 34 having a modified fan-like shape. In this case, the camera 2L photographs a subject inside the visual field including the shaded region 33, and the camera 2R photographs a subject inside the visual field including the shaded region 34. The shaded region 33 is located on the left side of the tractor 21 and the trailer 22. The shaded region 34 is located on the right side of the tractor 21 and the trailer 22. Arrows in the shaded region 33 denote a direction in which the visual field of the camera 2L widens. Arrows in the shaded region 34 denote a direction in which the visual field of the camera 2R widens. In FIGS. 5 and 6, the photographing direction of a rear camera 26 is rightward on the paper surface (direction from the front of the trailer 22 to the rear thereof).

FIG. 7 clearly shows a common portion of the visual field of the cameras 2L and 2R. The visual field of the camera 2L includes a shaded region 37 having a modified fan-like shape, and the visual field of the camera 2R includes a shaded region 38 having a modified fan-like shape. The shaded regions 37 and 38 overlap each other at portion located closer to the rear end of the trailer 22 than the connecting section 23.

The cameras 2L and 2R photograph a region including part of the trailer 22 in common. Specifically, the cameras 2L and 2R have a common visual field on the trailer 22 side. In FIG. 7, a hatching region numbered with numeral 39 where the shaded region 37 and the shaded region 38 overlap each other indicates this common visual field (both the shaded regions 37 and 38 include the hatching region 39). This common visual field includes the tire 24 and part of the bottom surface 27. Although at least two tires 24 are provided here, not all the tires 24 may be included in the common visual field depending on the connecting angle θ. The common visual field in relation to the tractor 21 is defined depending on the view angles (angles of field), installation positions, and installation directions of the cameras 2L and 2R. It is specified by the connecting angle θ, the length of the trailer 22, and the like which portion of the trailer 22 is included in this common visual field.

As shown in FIGS. 5 to 7, the camera 2L is so installed as to have a horizontally wide view angle. Specifically, the camera 2L is installed on the left side of the rear end of the tractor 21 in a manner such as to have a horizontal view angle of 200° or more. The visual field of the camera 2L includes: the left side surface of the tractor 21; the road surface located to the left side of the tractor 21 and the trailer 22; and the bottom surface 27 of the trailer 22. The visual field of the camera 2L further includes the road surface located to the right side of the trailer 22 depending on the connecting angle θ.

FIG. 8B shows an example of a left panorama image obtained through photographing by the camera 2L. This left panorama image presents the left side surface 41L of the tractor 21, a back mirror 42L provided on the left side of the tractor 21, the road surface 43L located to the left side of the tractor 21 and the trailer 22, the tires 24 and bottom surface 27 of the trailer 22, and the road surface 44 located to the right side of the trailer 22. In FIG. 8B and the figures to be described later showing a left panorama image, the rightward direction on the paper surface corresponds to a direction approaching the left side surface 41L of the tractor 21.

The camera 2R, as is the case with the camera 2L, is so installed as to have a horizontally wide view angle. Specifically, the camera 2R is installed on the right side of the rear end of the tractor 21 in a manner such as to have a horizontal view angle of 200° or more. The visual field of the camera 2R includes: the right side surface of the tractor 21; the road surface located to the right side of the tractor 21 and the trailer 22; and the bottom surface 27 of the trailer 22. The visual field of the camera 2R further includes the road surface located to the left side of the trailer 22 depending on the connecting angle θ.

FIG. 8A shows an example of a right panorama image obtained through photographing by the camera 2R. This right panorama image presents the right side surface 41R of the tractor 21, a back mirror 42R provided on the right side of the tractor 21, the road surface 43R located to the right side of the tractor 21 and the trailer 22, the tires 24 and bottom surface 27 of the trailer 22, and the road surface 45 located to the left side of the trailer 22. In FIG. 8A and the figures to be described later showing a right panorama image, the leftward direction on the paper surface corresponds to a direction approaching the right side surface 41R of the tractor 21.

Figure 9:
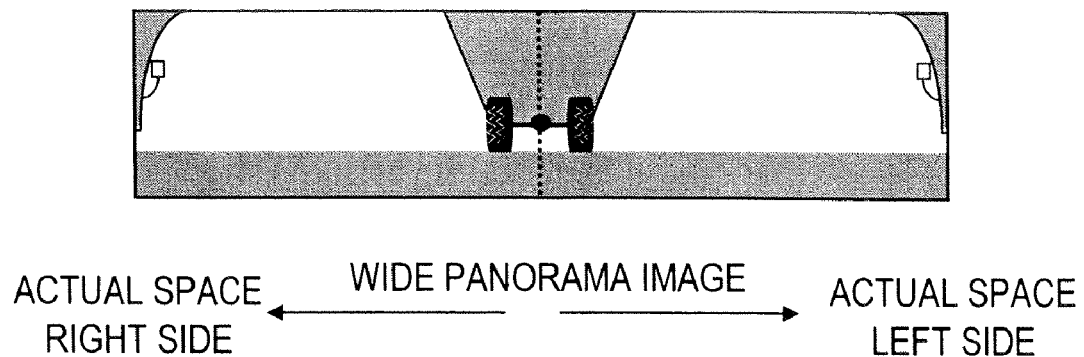
FIG. 9 is a diagram showing a wide panorama image obtained by synthesizing the right and left panorama images of FIGS. 8A and 8B.

The panorama image generation parts 3L and 3R, the image synthesis part 4, the video signal output part 5, and the display device 6 of FIG. 1 are also installed in the tractor 21 side. The image synthesis part 4 synthesizes a right panorama image as shown FIG. 8A and a left panorama image as shown in FIG. 8B to generate a wide panorama image as shown in FIG. 9. In FIG. 9 and the figures to be described later showing a wide panorama image, the left side on the paper surface corresponds to the right side of the tractor 21 and the like in actual space. Thus, by the image synthesis part 4 or the video signal output part 5, the left and right of this wide panorama image are reversed and the reversed image (that is, the image mirror-reversed horizontally) is displayed as a display image on the display device 6

Figure 10:
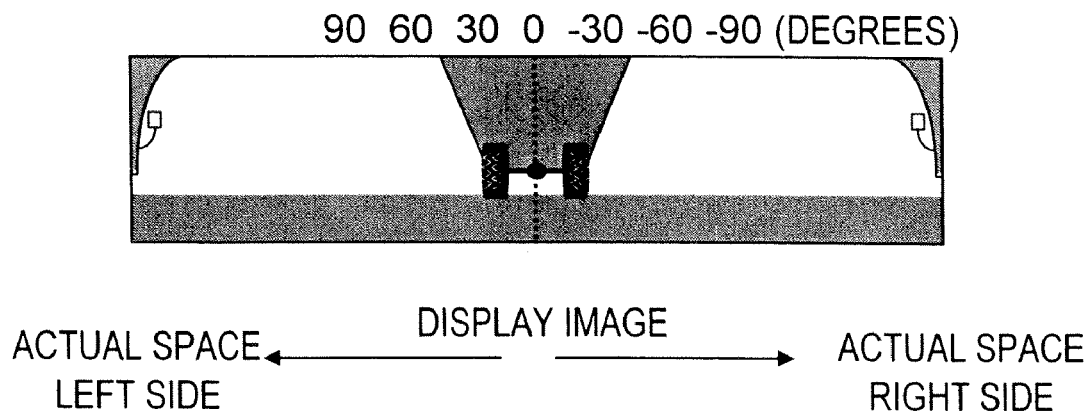
FIG. 10 is a diagram showing a display image based on the wide panorama image of FIG. 9.
Figure 11:
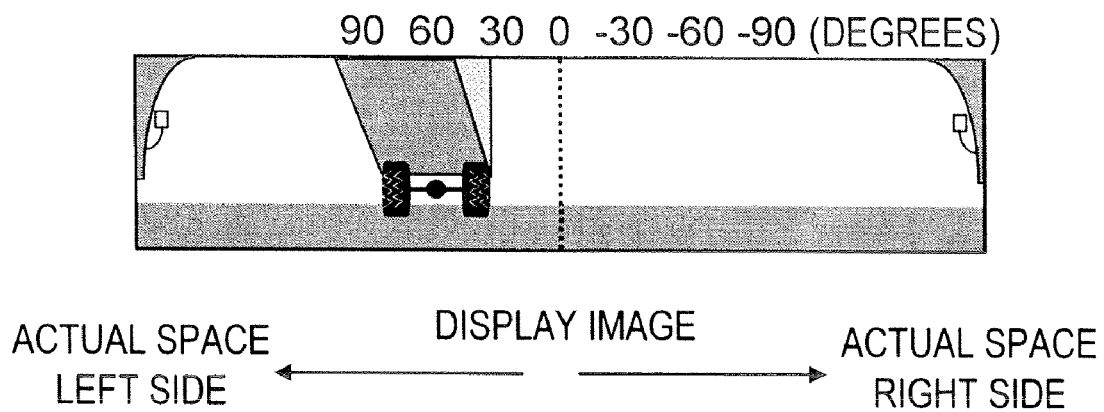
FIG. 11 is a diagram showing another example of the display image displayed on a display device of FIG. 1.

FIG. 10 shows a display image corresponding to the wide panorama image of FIG. 9. The display image shown in FIG. 10 refers to a case where the connecting angle θ is 0°. FIG. 11 shows an example of a display image at left turn (for example, when θ=60°) (a method of synthesis for a wide panorama image serving as a basis for these display images will be described later). Referring to these display images permits the driver to check the rear and sides of the vehicle as if he or she saw a back mirror, thereby supporting safety check of the vehicle surrounding and driving operation in various driving conditions such as parking, starting, left turn, and the like. As in the transition from FIG. 10 to FIG. 11, the rear part of the trailer 22 moves horizontally on the wide panorama image and the display image in accordance with the connecting angle θ, and the driver can intuitively recognize the connecting angle θ with reference to the display image. Moreover, since the cameras 2L and 2R are installed on the tractor 21 side, the visual field support device 1 effectively functions even when the trailer 22 to be pulled is replaced with another trailer 22.

As shown in FIGS. 10 and 11, adding a scale representing connecting angles θ to the display image permits the driver to recognize the connecting angle θ in more detail. This scale may be added to the wide panorama image. The position where the scale is added on the display image (or wide panorama image), that is, with what values and at which position on the display image (or wide panorama image) the scale are added can be determined through calculation by trigonometric function in accordance with the length of the trailer 22 or the like. Alternatively, if the connecting angle θ has been already detected as described later, for example, the center position between the left and right tires 24 on the display image (or wide panorama image) may be obtained by pattern matching or the like, and the scale adding position on the display image (or wide panorama image) may be defined based on the center position and the detection result of the connecting angle θ.

In the figures (FIGS. 9 to 11, and the like) representing the wide panorama image or the display images, a broken line provided at the image center so as to bisect the wide panorama image or the display image is a center line of the wide panorama image or the display image. This center line corresponds to marking 0° representing the connecting angle θ (see FIG. 10). Such a center line is also provided in an actual wide panorama image or display image (this center line may not be provided).

Next, the method of synthesis for a wide panorama image performed by the image synthesis part 4 of FIG. 1 will be described. As described above, the common visual field of the cameras 2L and 2R is defined by the view angels, installation positions, installation directions of the cameras 2L and 2R; therefore, it is possible to tentatively generate a wide panorama image by blending (mixing) a partial image within the left panorama image and a partial image within the right panorama image both corresponding to the aforementioned common visual field.

Figure 12A:
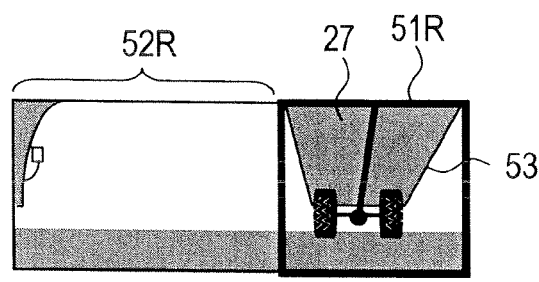
FIG. 12A is a diagram showing an example of a right panorama image generated through photographing by the camera of FIG. 1 (when the connecting angle is 0°), for explaining a first synthesis method according to the embodiment of the invention.
Figure 12B:
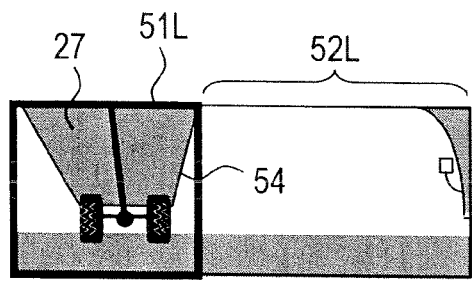
FIG. 12B is a diagram showing an example of a left panorama image generated through photographing by the camera of FIG. 1 (when the connecting angle is 0°), for explaining the first synthesis method according to the embodiment of the invention.

However, due to a parallax present between the cameras 2L and 2R, the bottom surfaces of the trailer 22 and the like projected on the cameras 2L and 2R do not completely agree each other even when the connecting angle θ is 0°. FIGS. 12A and 12B show a right panorama image and a left panorama image, respectively, when a connecting angle θ of 0°.

An image region 51R within a thick rectangular frame in the right panorama image of FIG. 12A and an image region 51L within a thick rectangular frame in the left panorama image of FIG. 12B are both a photographed image region of the common visual field. For example, an end 53 of the bottom surface 27 in the right panorama image and an end 54 of the bottom surface 27 in the left panorama image appear differently on the respective images due to the parallax although they are identical in an actual space. Thus, blending the image regions 51R and 51L simply by averaging processing or the like results in a double image appearing on a wide panorama image.

Figure 13A:
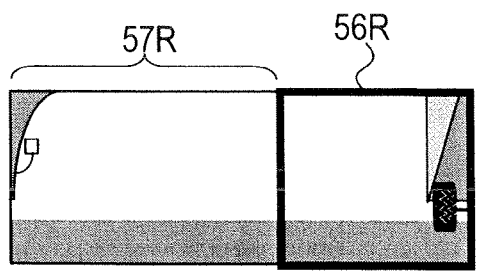
FIG. 13A is a diagram showing an example of a right panorama image generated through photographing by the camera of FIG. 1 (when the connecting angle is positive), for explaining the first synthesis method according to the embodiment of the invention.
Figure 13B:
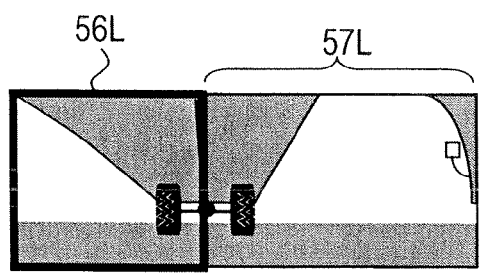
FIG. 13B is a diagram showing an example of a left panorama image generated through photographing by the camera of FIG. 1 (when the connecting angle is positive), for explaining the first synthesis method according to the embodiment of the invention.

Further, with an increasing connecting angle θ, a difference in how the trailer 22 appears between the cameras 2L and 2R increases as shown in FIGS. 13A and 13B, which cannot be handled by simple blending. FIGS. 13A and 13B represents a right panorama image and a left panorama image, respectively, when the connecting angle θ is positive (for example, θ=60°). An image region 56R within a thick rectangular frame in the right panorama image of FIG. 13A and an image region 56L within a thick rectangular frame in the left panorama image of FIG. 13B are both a photographed image region of the common visual field.

In the right panorama image of FIG. 12A, an image region other than the image region 51R is called a non-common image region 52R. In the left panorama image of FIG. 12B, an image region other than the image region 51L is called a non-common image region 52L. In the right panorama image of FIG. 13A, an image region other than the image region 56R is called a non-common image region 57R. In the left panorama image of FIG. 13B, an image region other than the image region 56L is called a non-common image region 57L.

Considering such conditions, the image synthesis part 4 of FIG. 1 performs synthesis for a wide panorama image. The method of synthesis for a wide panorama image performed by the image synthesis part 4 is illustrated by a first to third synthesis methods below.

[First Synthesis Method]

First, the first synthesis method will be described. In the first synthesis method, image synthesis is performed by utilizing magnitude relation in the luminance of the common visual field. As a result, a wide panorama image shown in FIG. 14 is obtained from the right panorama image and the left panorama image respectively shown in FIGS. 12A and 12B, and a wide panorama image shown in FIG. 15 is obtained from the right panorama image and the left panorama image respectively shown in FIGS. 13A and 13B.

Figure 14:
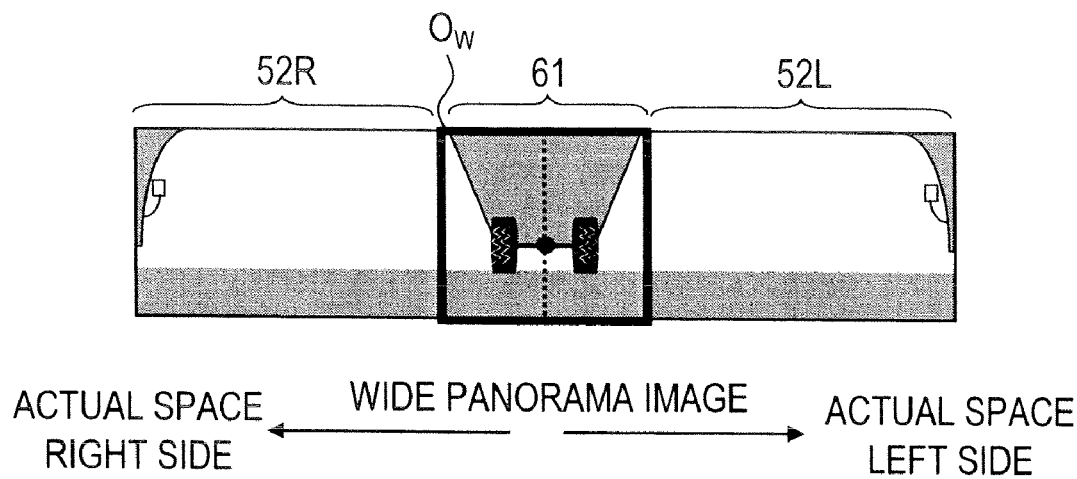
FIG. 14 is a diagram showing a wide panorama image obtained by synthesizing the right and left panorama images shown in FIGS. 12A and 12B.

The wide panorama image shown in FIG. 14 is composed of: an image of the non-common image region 52R of FIG. 12A appearing on the left side on the paper surface of FIG. 14; an image of the non-common image region 52L of FIG. 12B appearing on the right side on the paper surface of FIG. 14; and an image of a common image region 61 sandwiched between the aforementioned two regions. In FIG. 14, the common image region 61 is indicated by a rectangular frame, which does not appear in an actual wide panorama image. In FIG. 14, "$O_W$" denotes an original point in the common image region 61. As described above, in the figures representing a wide panorama image, the left side on the paper surface corresponds to the right side of the tractor 21 and the like in the actual space.

Figure 15:
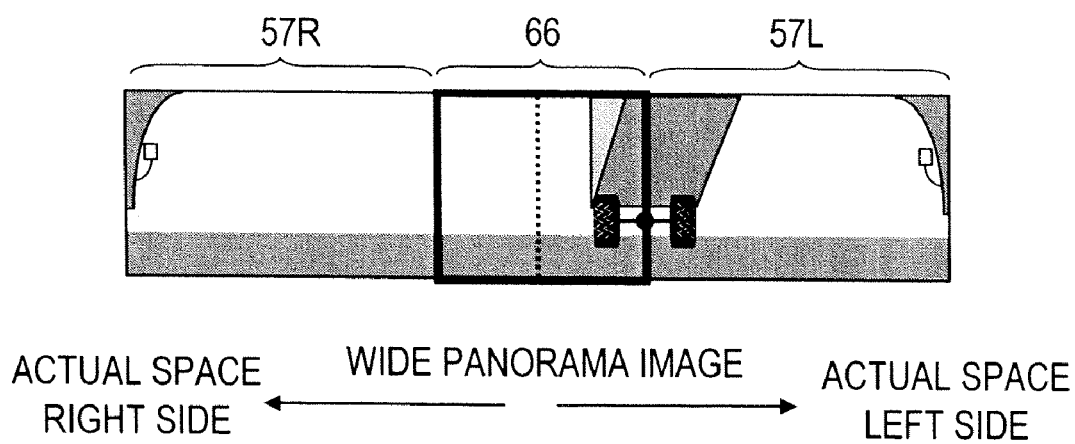
FIG. 15 is a diagram showing a wide panorama image obtained by synthesizing the right and left panorama images shown in FIGS. 13A and 13B.

The wide panorama image shown in FIG. 15 is composed of: an image of the non-common image region 57R of FIG. 13A appearing on the left side on the paper surface of FIG. 15; an image of the non-common image region 57L of FIG. 13B appearing on the right side on the paper surface of FIG. 15; and an image of a common image region 66 sandwiched between the aforementioned two regions. In FIG. 15, the common image region 66 is indicated by a rectangular frame, which does not appear in an actual wide panorama image.

Now, refer to FIGS. 16A and 16B, which respectively show, on an enlarged scale, image regions 51R and 51L, the same as those shown in FIGS. 12A and 12B. An origin $O_R$ in the image region 51R is defined, and an origin corresponding thereto in the image region 51L is defined as $O_L$. The image regions 51R and 51L are each formed of M×N pixels (with M pixels arranged vertically and N pixels arranged horizontally), where M and N are each an integer of 2 or larger.

Figure 17:
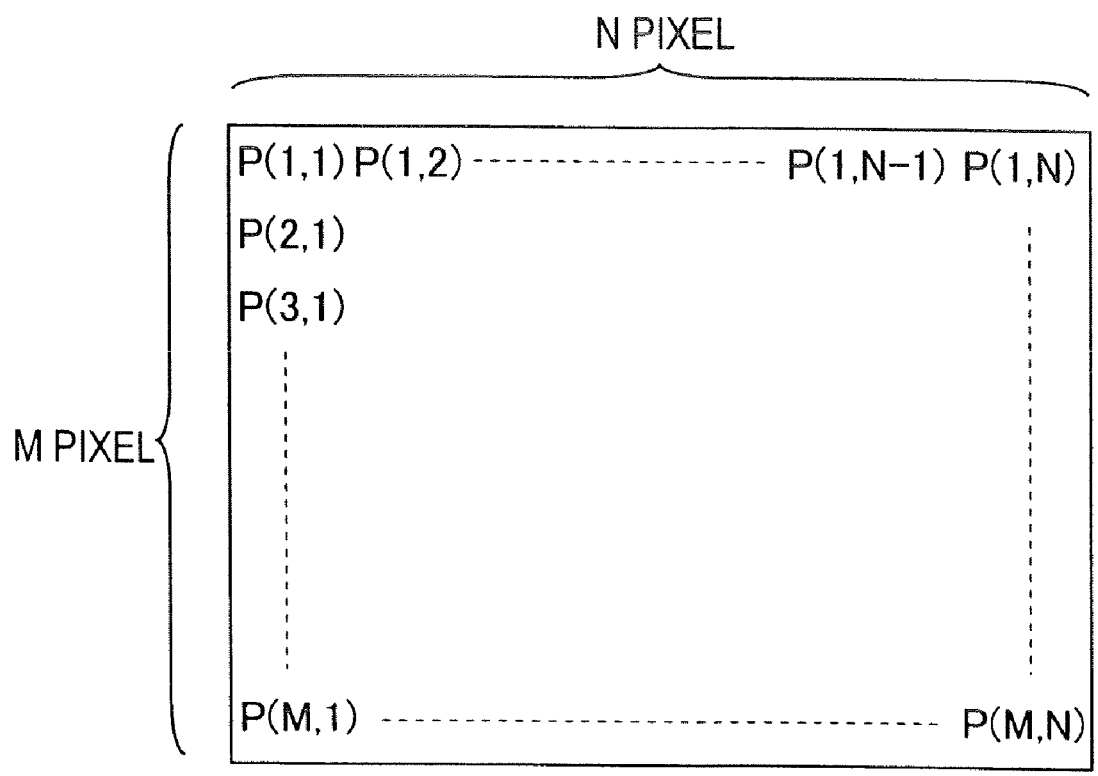

FIG. 17 shows a pixel array in each of the image regions 51R and 51L and also a pixel array in each of the common image regions 61 and 66 (see FIGS. 14 and 15). Pixels forming these image regions are expressed by P(m, n). Here, "m" denotes the vertical position of the image and takes an integer of 1 to M, and "n" denotes the horizontal position of the image and takes an integer of 1 to N. The origins $O_R$ and $O_L$ and the origin $O_W$ shown in FIG. 14 correspond to a pixel P (1, 1).

The image synthesis part 4 of FIG. 1 makes pixel-by-pixel comparisons on the luminance between the image regions 51R and 51L. This comparison is performed between the pixels corresponding to the same pixel position. Specifically, between the image region 51R and the image region 51L, for example, the luminance between the pixels P (1,1) are compared, and the luminance between the pixels P (1,2) are compared. As a result of these comparisons, a pixel signal of the pixel P (m, n) with the larger luminance is provided as a pixel signal of a pixel P (m, n) in the common image region 61.

Specifically, for example, if the luminance of the pixel P (100, 200) corresponding to numeral 71 in the image region 51R of FIG. 16A is larger than that of the pixel P (100, 200) corresponding to numeral 72 in the image region 51L of FIG. 16B, a pixel signal of the pixel P (100, 200) of the image region 51R is provided as a pixel signal of the pixel P (100, 200) in the common image region 61. For example, if the luminance of the pixel P (100, 50) corresponding to numeral 73 in the image region 51R of FIG. 16A is smaller than that of the pixel P (100, 50) corresponding to numeral 74 in the image region 51L of FIG. 16B, a pixel signal of the pixel P (100, 50) of the image region 51L is provided as a pixel signal of the pixel P (100, 50) in the common image region 61. Such comparison processing is performed on all of the pixels forming the image region 51R and the image region 51L to determine pixel signals of all the pixels of the common image region 61.

As described above, to form an image of the common image region 61 (see FIG. 14) corresponding to the common visual field, the pixel signals of the pixels with larger luminance are preferentially used, thereby providing a wide panorama image as shown in FIG. 14. Similarly, the respective images of the image regions 56R and 56L of FIGS. 13A and 13B are synthesized to form an image of the common image region 66 shown in FIG. 15.

Typically, the bottom part of the trailer 22 is dark while the outer periphery thereof is bright. Thus, through this processing, the outer periphery preferentially appears in a wide panorama image. Not the bottom part of the trailer 22 but the outer periphery thereof requires safety check during driving of the tractor 21. Thus, in the first synthesis method, the outer periphery is preferentially mapped to generate a wide panorama image and a display image. This consequently provides an adequate wide panorama image and an adequate display image preferentially displaying a video that requires the check, and also avoids occurrence of a problem that an image on a wide panorama image appears double.

Pixel signals related to a given pixel includes: for example, a brightness signal representing the brightness of this pixel; and a color signal (color-difference signal or the like) representing the color of this pixel.

[Second Synthesis Method]

Next, the second synthesis method will be described. In the second synthesis method, the position of a predetermined portion of the trailer 22 on an image is detected, and a result of this detection is utilized to perform image synthesis.

Figure 18:
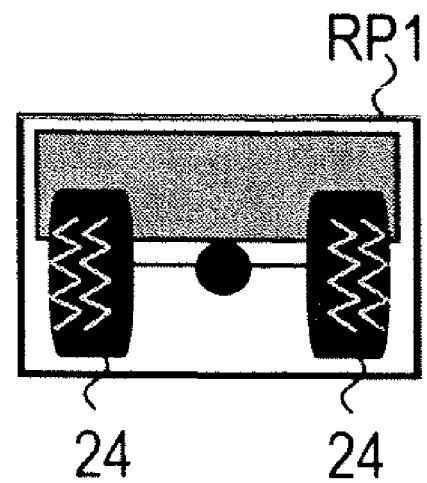
FIG. 18 is a diagram for explaining a second synthesis method of synthesizing right and left panorama images, showing an example of a registered image pattern for use in pattern matching in the second synthesis method.

More specifically, for example, an image pattern of the tires 24 as shown in FIG. 18 is previously registered. This registered image pattern is referred to as a registered image pattern RP1. A standard image pattern on a left panorama image or a right panorama image for the two left and right tires to be provided at the rear of the trailer 22 is defined as the registered image pattern RP1.

When a right panorama image or a left panorama image respectively as shown in FIGS. 8A and 8B are obtained, the image synthesis part 4 of FIG. 1 performs pattern matching (for example, template matching) between each of the right and left panorama images and the registered image pattern RP1, and specifies the position of a partial image where correlation with the registered image pattern RP1 is greatest in the right panorama image and the position of a partial image where correlation with the registered image pattern RP1 is greatest in the left panorama image.

Figure 19A:
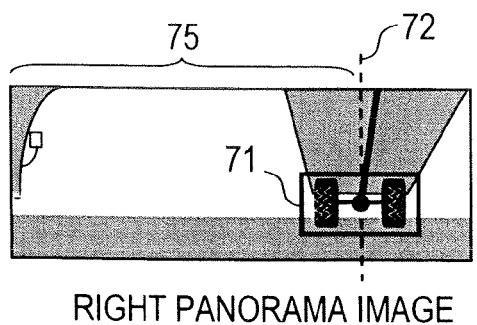
FIG. 19A is a diagram for explaining a synthesis method using the registered image pattern of FIG. 18, showing a right panorama image as an image subjected to this synthesis.

For example, in a right panorama image shown in FIG. 19A, correlation between the registered image pattern RP1 and a partial image 71 is greatest, and thus the position of this partial image 71 in the right panorama image is specified. Then in the right panorama image, the center line of the partial image 71 bisecting the left and right tires 24 is defined as a synthesis boundary 72. Similarly, in a left panorama image shown in FIG. 19B, correlation between the registered image pattern RP1 and a partial image 73 is greatest, and thus the position of this partial image 73 in the left panorama image is specified. Then in the left panorama image, the center line of the partial image 73 bisecting the left and right tires 24 is defined as a synthesis boundary 74.

Figure 19B:
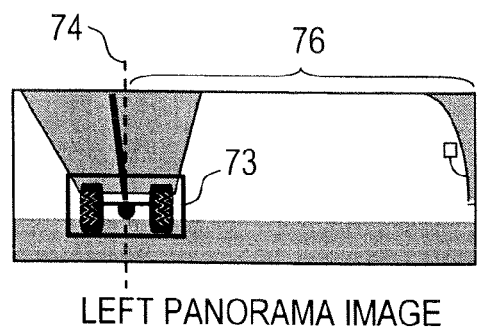
FIG. 19B is a diagram for explaining the synthesis method using the registered image pattern of FIG. 18, showing a left panorama image as an image subjected to this synthesis.

Then the image synthesis part 4 joins together (that is, links together) the right panorama image of FIG. 19A and the left panorama image of FIG. 19B at the synthesis boundaries 72 and 74 to thereby generate a wide panorama image. That is, the wide panorama image is formed by joining together a partial image 75 located to the left, on the paper surface, of the synthesis boundary 72 in the right panorama image and a partial image 76 located to the right, on the paper surface, of the synthesis boundary 74 in the left panorama image. This provides a wide panorama image as shown in FIG. 9.

Instead of by simply joining together the right panorama image and the left panorama image at the synthesis boundaries, by blending image portions corresponding to the bottom surface 27 and tires 24 of the trailer 22 between the right panorama image and the left panorama image, pixel signals of the corresponding image portion in a wide panorama image may be generated. As a result, a smooth image joining portion is expressed on the wide panorama image. The range of an image targeted for blending is defined, for example, with reference to the synthesis boundaries as a center. Here, blending means mixing pixel signals of a pixel targeted for blending at a predetermined ratio, for example, averaging the pixel signals.

The illustration refers to a case where the two left and right tires 24 appear in both the right panorama image and the left panorama image. There is a possible case where only one of the two left and right tires 24 appear in the images depending on the connecting angle θ. To cone with such a case, it is advised that a registered image pattern RP2 (see FIG. 20) of only the right tire 24 and a registered image pattern RP3 (see FIG. 21) of only the left tire 24 be prepared.

Figure 20:
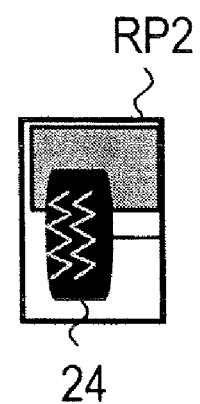
FIG. 20 is a diagram for explaining the second synthesis method of synthesizing right and left panorama images, showing another example of the registered image pattern for use in pattern matching in the second synthesis method.
Figure 22A:
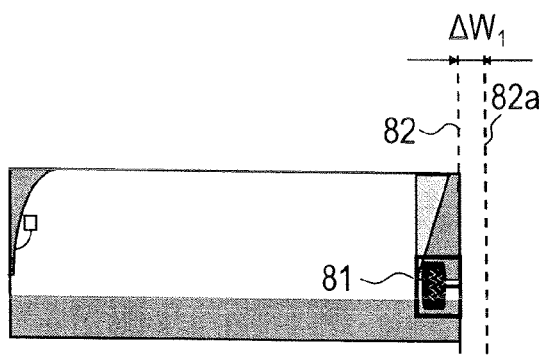
FIG. 22A is a diagram for explaining a synthesis method using the registered image patterns of FIGS. 18 and 20, showing a right panorama image as an image subjected to this synthesis.
Figure 22B:
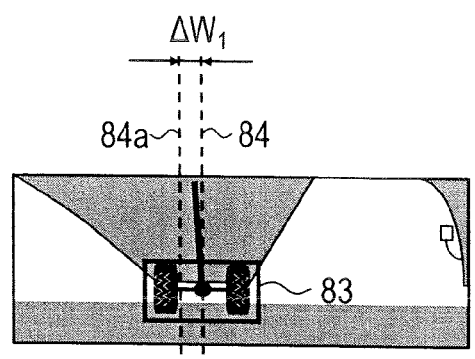
FIG. 22B is a diagram for explaining the synthesis method using the registered image patterns of FIGS. 18 and 20, showing a left panorama image as an image subjected to this synthesis.

Then when a right panorama image and a left panorama image as shown in FIGS. 22A and 22B are obtained, the image synthesis part 4 of FIG. 1 performs pattern matching (for example, template matching in particular) between the right panorama image and the registered image pattern RP2 of FIG. 20, and then specifies the position of a partial image 81 where correlation with the registered image pattern RP2 is greatest in the right panorama image. The image synthesis part 4 also performs pattern matching (for example, template matching in particular) between the left panorama image and the registered image pattern RP1 of FIG. 18, and then specifies the position of a partial image 83 where correlation with the registered image pattern RP1 is greatest in the left panorama image.

Subsequently, in the right panorama image of FIG. 22A, based on the position of the partial image 81, a synthesis boundary 82 is specified which corresponds to the synthesis boundary 72 of FIG. 19A. In an example shown in FIG. 22A, the synthesis boundary 82 substantially agrees with the end of the right panorama image. The synthesis boundary 82 corresponds to a predicted line of a center line bisecting the left and right tires 24 in the right panorama image. In addition, in the left panorama image of FIG. 22B, a center line of a partial image 83 bisecting the left and right tires 24 is defined as a synthesis boundary 84. Finally, the right panorama image of FIG. 22A and the left panorama image of FIG. 22B are joined together at the synthesis boundaries 82 and 84 to thereby generate a wide panorama image.

In a case where, in the right panorama image of FIG. 22A, the position of the partial image 81 moves further rightward on the paper surface and a predicted line, like a line 82a, of the center line bisecting the left and right tires 24 lies outside the right panorama image, the synthesis boundary 84 in the left panorama image is moved leftward on the paper surface by the width Δw₁ (equal to a horizontal distance between the synthesis boundary line 82 and the line 82a in this example) of the image extending out of the right panorama image. Then a wide panorama image can be generated by joining together the right panorama image and the left panorama image at a synthesis boundary 84a obtained by this movement. In this case, the entire right panorama image appears on the wide panorama image.

Figure 21:
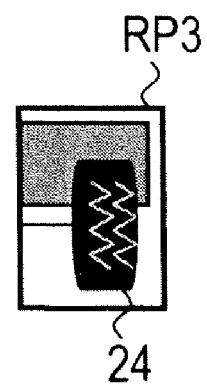
FIG. 21 is a diagram for explaining the second synthesis method of synthesizing right and left panorama images, showing another example of the registered image pattern for use in pattern matching in the second synthesis method.

The above description refers to a case where the registered image pattern RP2 of FIG. 20 is used. The same description applies to a case where the registered image pattern RP3 of FIG. 21 is used.

The image synthesis may be performed by using as the registered image pattern those other than the tires 24. For example, marking (a mark) is provided at predetermined position (for example, position on the center line 36 of FIG. 7) of the bottom surface 27 or rear end 25 of the trailer 22. This marking is so located as to fit in the common visual field 39 of FIG. 7. Then on the right panorama image and the left panorama image, the position of this marking may be specified and then a synthesis boundary may be obtained with reference to the specified position to synthesize the right panorama image and the left panorama image.

Also by use of the second synthesis method, problems such as that an image on a wide panorama image appears double can be avoided, thus permitting generation of an appropriate wide panorama image.

In the second synthesis method, a portion detector for specifying the position of a particular portion (tires 24, the marking, or the like) of the trailer 22 on an image functions effectively. This portion detector can be interpreted to be included in the image synthesis part 4 of FIG. 1. In addition, the registered image patterns (RP1 to RP3, and the like) are previously registered in a memory provided inside or outside of the image synthesis part 4 so that they can be referred to by the image synthesis part 4 of FIG. 1.

[Third Synthesis Method]

Next, the third synthesis method will be described. In the third synthesis method, the connecting angle θ is detected and then image synthesis is performed by utilizing a result of the detection of the connecting angle θ. Thus, when the third synthesis method is adopted, a connecting angle detection part 7 is added to the visual field support device 1 of FIG. 1, thus resulting in a configuration block diagram of the visual field support device as shown in FIG. 23. The visual field support device of FIG. 23 differs from the visual field support device 1 of FIG. 1 in that the connecting angle detection part 7 is added to the visual field support device 1 of FIG. 1, and the both visual field support devices agree with each other in other points, overlapping description of which will be omitted.

The connecting angle detection part 7 detects the connecting angle θ by employing well-known technology as described in JP-A-2002-120775 or JP-A-2002-181518. The result of detection of the connecting angle θ is transmitted to the image synthesis part 4. The image synthesis part 4, based on the connecting angle θ detected by the connecting angle detection part 7, obtains synthesis boundaries on the right panorama image and the left panorama image to thereby generate a wide panorama image.

Figure 24A:
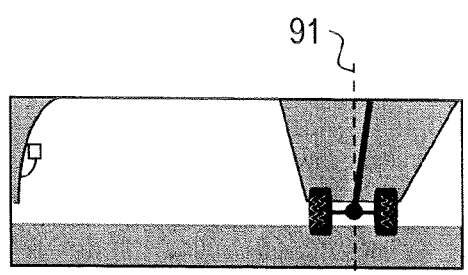
FIG. 24A is a diagram for explaining the third synthesis method according to the embodiment of the invention, showing one example of a right panorama image generated through photographing by the camera of FIG. 1 (when the connecting angle is 0°)
Figure 24B:
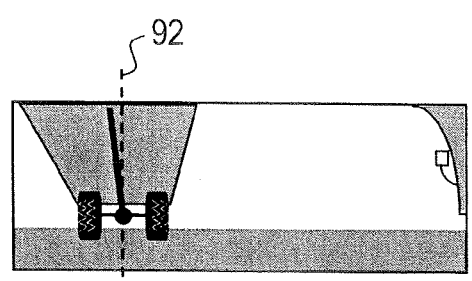
FIG. 24B is a diagram for explaining the third synthesis method according to the embodiment of the invention, showing one example of a left panorama image generated through photographing by the camera of FIG. 1 (when the connecting angle is 0°)

Here, a synthesis boundary when the connecting angle θ is 0° is defined as a reference synthesis boundary. FIGS. 24A and 24B show a right panorama image and a left panorama image, respectively, when the connecting angle θ is 0°. On these images, reference synthesis boundaries are expressed by numerals 91 and 92. When the connecting angle θ is 0°, the reference synthesis boundaries 91 and 92 are directly provided as synthesis boundaries, at which the right panorama image and the left panorama image are joined together (that is, linked together), thereby generating a wide panorama image.

FIGS. 25A and 25B show a right panorama image and a left panorama image, respectively, when the connecting angle θ is 60°. The positions of reference synthesis boundaries 91 and 92 on the images are fixed regardless of the connecting angle θ. When the connecting angle θ is 60°, a boundary obtained by moving the reference synthesis boundary by an amount corresponding to this 60° is provided as an actual synthesis boundary. Specifically, on the right panorama image shown in FIG. 25A, a boundary obtained by moving the reference synthesis boundary 91 rightward on the paper surface by an amount corresponding to 60° is provided as a synthesis boundary 93. On the left panorama image shown in FIG. 25B, a boundary obtained by moving the reference synthesis boundary 92 rightward on the paper surface by an amount corresponding to 60° is provided as a synthesis boundary 94.

Figure 26:
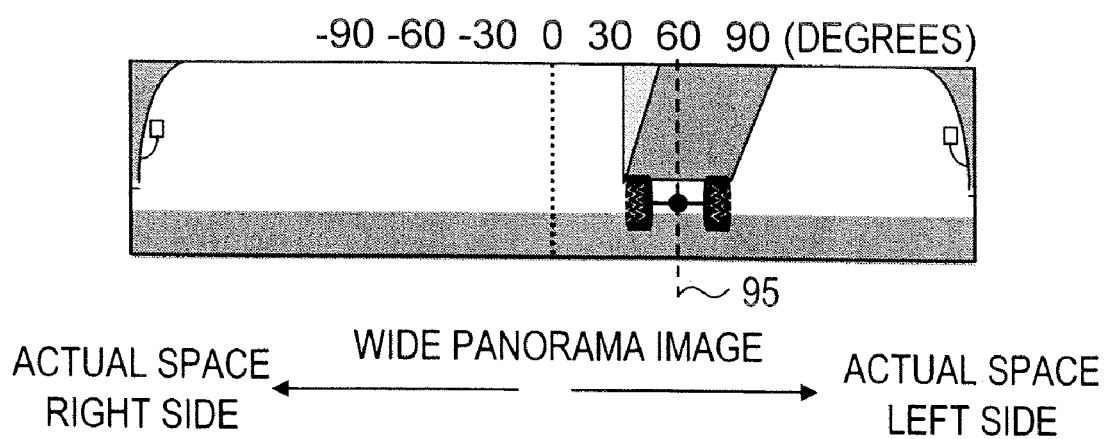
FIG. 26 is a diagram showing a wide panorama image obtained by synthesizing the right and left panorama images shown in FIGS. 25A and 25B.

Then the image synthesis part 4 joins together (that is, linking together) the right panorama image of FIG. 25A and the left panorama image of FIG. 25B at the synthesis boundaries 93 and 94, thereby generating a wide panorama image as shown in FIG. 26. In FIG. 26, numeral 95 denotes a synthesis boundary on the wide panorama image corresponding to the synthesis boundaries 93 and 94. The wide panorama image of FIG. 26 shows a scale representing the connecting angle θ.

Instead of by simply joining together the right panorama image and the left panorama image at the synthesis boundaries, by blending image portions corresponding to the bottom surface 27 and tires 24 of the trailer 22 between the right panorama image and the left panorama image, pixel signals of the corresponding image portion in the wide panorama image may be generated. As a result, a smooth image joining portion is expressed on the wide panorama image. The range of an image targeted for blending is defined, for example, with reference to the synthesis boundary as a center.

When the connecting angle θ increases, for example, in the positive direction, the synthesis boundary on the right panorama image of FIG. 25A may move further rightward on the paper surface, extending out of the right panorama image. The synthesis boundary on the right panorama image in this case is expressed by numeral 93a. In this case, the synthesis boundary 94 on the left panorama image is moved leftward on the paper surface by a width $\Delta W_2$ (equal to a horizontal distance between the synthesis boundary 93 and the synthesis boundary 93a in this example) of the image extending out of the right panorama image. Then a wide panorama image can be generated by joining together the right panorama image and the left panorama image at the synthesis boundary 94a obtained by this movement. In this case, the entire right panorama image appears on the wide panorama image. The above description refers to a case where the connecting angle θ is positive, and similarly applies to a case where the connecting angle θ is negative.

Also by use of the third synthesis method, problems such as that an image on a wide panorama image appears double can be avoided, thus permitting generation of an appropriate wide panorama image.

The positions of the reference synthesis boundaries 91 and 92, and the positions of the synthesis boundaries (93 and the like) on the image defined in accordance with the connecting angle θ are previously set based on view angles (angles of field), installation positions, installation directions, and the like of the cameras 2L and 2R.

Moreover, the connecting angle θ may be obtained in the following manner. For example, a sensor (not shown) is provided at the connecting section 23 shown in FIG. 7 to thereby obtain the connecting angle θ. The trailer 22 bends with respect to the tractor 21 with the connecting section 23 as a support point, so that the amount and angle of this bending can be detected by the sensor to obtain the connecting angle θ.

Alternatively, for example, marking (a mark) is provided at a predetermined position of the bottom surface 27 or rear end 25 of the trailer 22 (for example, position on the center line 36 of FIG. 7). This marking is so set as to fit in the common visual field 39 of FIG. 7. Then on the right panorama image and the left panorama image, the position of this marking is specified and the connecting angle θ is obtained from the specified position. The relationship between the position of the marking on the image and the connecting angle θ is previously obtained in accordance with the marking setting position in an actual space, and the like.

[Use of Rear Camera]

In the visual field support device 1 of FIG. 1, it is arbitrary whether or not the rear camera 26 shown in FIGS. 4 to 7 is used. An example where the rear camera 26 is used will be described below.

The rear camera 26 photographs the rear of the trailer 22 as described above. A photographing signal representing an image obtained through photographing by the rear camera 26 is supplied to the image synthesis part 4 of FIG. 1. The image obtained through the photographing by the rear camera 26 (photographing image of the rear camera 26) is hereinafter referred to as a rear image. When the rear image from the rear camera 26 is used, the image synthesis part 4 fits the rear image in an image portion of the trailer 22 within the wide panorama image generated as described above to thereby generate a final wide panorama image (multiple synthetic image). An image obtained by horizontally reversing this final wide panorama image (that is, image horizontally mirror-reversed) is transmitted to the display device 6 via the video signal output part 5 of FIG. 1, and then displayed as a display image on the display device 6.

Figure 27:
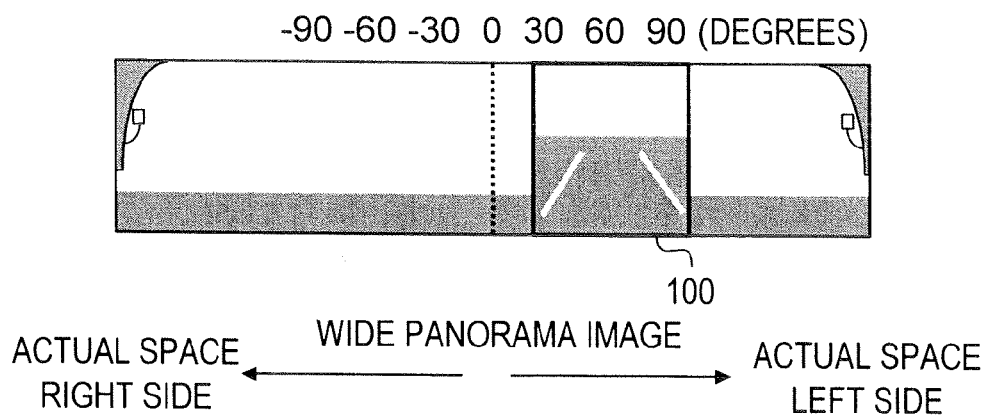
FIG. 27 is a diagram showing an image obtained by fitting a rear image obtained by a rear camera of FIG. 4 and the like in the wide panorama image of FIG. 26.

For example, when the rear image is fitted in the image portion of the trailer 22 within the wide panorama image shown in FIG. 26, a final wide panorama image generated is as shown in FIG. 27. In FIG. 27, numeral 100 denotes the rear image fitted. Fitting the rear image in the wide panorama image in this manner permits checking almost 360 degrees of visual field around the vehicle on the display device 6, thus ensuring high safety and also reducing loads imposed on the driver.

The image portion of the trailer 22 within the wide panorama image in which the rear image is to be fitted is a portion where a component (tires 24, bottom surface 27, and the like) of the trailer 22 appears on a wide panorama image provided before the rear image is fitted, and typically, for example, a rectangular region including a portion where the component (tires 24, bottom surface 27, and the like) of the trailer 22 appears on the wide panorama image provided before the rear image is fitted.

By using the result of detection performed by the portion detector described in the second synthesis method or the result of detection of connecting angle θ described in the third synthesis method, it can be determined in which portion within the wide panorama image the rear image is fitted. The portion detector described above can specify the position of a predetermined portion (tires 24, the marking described above, or the like) of the trailer 22 on the image. Thus, by referring to this specification details, the position of the trailer 22 on the wide panorama image is specified. Moreover, recognition of the connecting angle θ specifies the synthesis boundaries (synthesis boundary 93 of FIG. 25A, and the like). Thus, by referring to this specification details, the position of the trailer 22 on the wide panorama image is specified.

Alternatively, after once generating a wide panorama image not including a rear image by using any of the first to third synthesis methods, this wide panorama image may be used to specify an image portion of the trailer 22 within this wide panorama image. For example, the image portion of the trailer 22 within the wide panorama image not including a rear image is specified by performing pattern matching (for example, template matching in particular) between a wide panorama image not including a rear image and the registered image pattern RP1 as shown in FIG. 18. Alternatively, based on a gray scale change component (edge component) of the wide panorama image not including a rear image, contour detection may be performed to thereby detect the image portion of the trailer 22.

When a rear image is simply fitted in the image portion of the trailer 22, as shown in FIG. 27, a level difference appears on the image of the road surface that is continuous in the actual space. To prevent appearance of this level difference, by projecting a rear image on a cylindrical surface identical to a cylindrical surface on which a left panorama image and a right panorama image are generated, the rear image may be converted into an image of the rear of the trailer 22 viewed with a middle point between the cameras 2L and 2R provided as a visual point and then this post-conversion rear image may be fitted in the image portion of the trailer 22 within the wide panorama image. This ensures image continuity at the portion where the rear image is fitted.

The rear camera 26 is usually installed in a tilted state so as to photograph the vicinity of the trailer 22. Thus, upon conversion processing, the tilt angle of the rear camera 26 needs to be considered. As the conversion processing taking this into consideration, well-known cylindrical surface projection conversion processing as disclosed in JP-A-2004-46573 may be used.

<Modifications and the Like>

Figure 28:
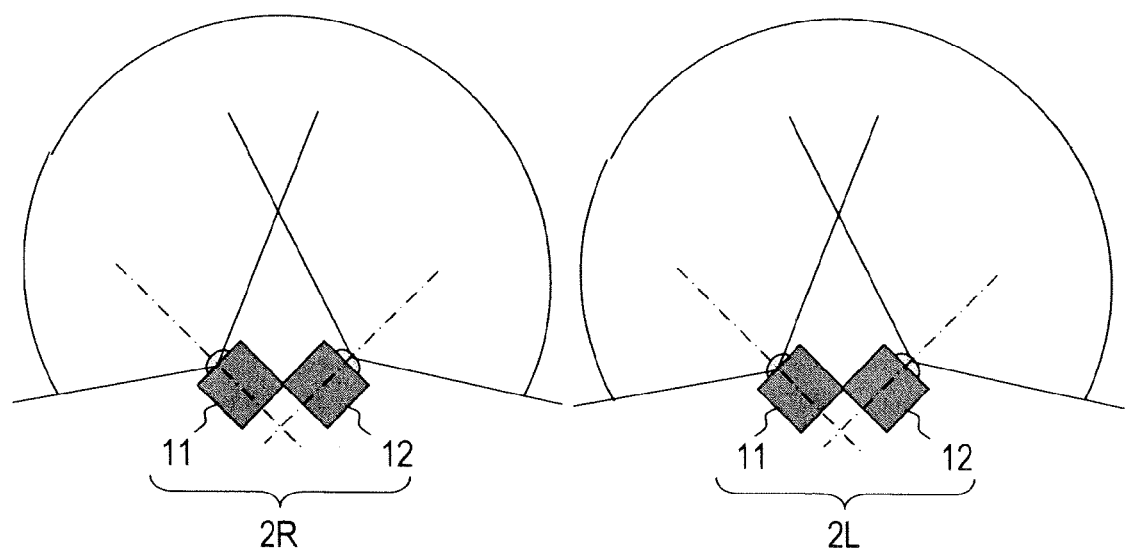
FIG. 28 is a diagram showing configuration examples of the respective two cameras of FIG. 1.

The embodiment described above refers to a method in which a left panorama image and a right panorama image are first individually generated and then a wide panorama image is generated from the generated left panorama image and right panorama image. Note that the order in which these images are generated can be changed. Consider, for example, a case as shown in FIG. 28 where the cameras 2L and 2R are each formed of wide-angle cameras 11 and 12 and the common visual field 39 of FIG. 7 is formed by a portion where the visual field of the wide-angle camera 11 of the camera 2L and the visual field of the wide-angle camera 12 of the camera 2R overlap each other.

In this case, the panorama image generation parts 3L and 3R in FIG. 1 (or FIG. 23) are omitted, and images respectively photographed by the wide-angle cameras 11 and 12 forming the camera 2L and images respectively photographed by the wide-angle cameras 11 and 12 forming the camera 2R are directly transmitted to the image synthesis part 4. Then the image synthesis part 4 synthesizes the image photographed by the wide-angle camera 11 of the camera 2L and the image photographed by the wide-angle camera 12 of the camera 2R by using the same method as described above, and joins together an image obtained by this synthesis, the image photographed by the wide-angle camera 12 of the camera 2L, and the image photographed by the wide-angle camera 11 of the camera 2R to thereby generate a wide panorama image.

The visual field support device of FIG. 1 or 23 can be realized by hardware, software, or the both in combination. The function of a portion (hereinafter referred to as portion a) composed of the panorama image generation parts 3L and 3R and the image synthesis part 4 can be realized by hardware, software, or the both in combination.

To realize the function of the portion a with software, all or part of the function realized by the portion a may be described as a program so that all or part of this function can be realized by executing this program on a computer. In a case where the portion α is realized with software, part of FIG. 1 or 23 shows a functional block diagram of the portion α.

In the embodiment described above, the cameras 2L and 2R each have a view angle of 200° or more including the visual field of the side surface of the tractor 21. The range of visual field can be modified as appropriate. For example, it is possible to exclude the side surface of the tractor 21 and the vicinity thereof from the visual field, even in which case a common visual field equivalent to the common visual field 39 of FIG. 7 needs to be ensured.

The embodiment described above, assuming the vehicle composed of the tractor 21 and the trailer 22 connected to the tractor 21, applies to this vehicle the visual field support device (for example, the visual field support device 1 of FIG. 1 or the visual field support device of FIG. 23) according to the invention. However, vehicles to which the visual field support device according to the invention is applicable are not limited to those composed of the tractor 21 and the trailer 22. For example, to an arbitrary vehicle (hereinafter referred to as "connected vehicle") composed of a first vehicle and a second vehicle connected to and pulled by the first vehicle, the visual field support device according to the invention is also applicable. In the embodiment described above, the first vehicle corresponds to the tractor 21 and the second vehicle corresponds to the trailer 22.

The connected vehicles include vehicles typically referred to as traction engines (or the connected vehicles are traction engines). The connected vehicles include, for example, an articulated bus, a connected bus, and a trolley bus which are each composed of a first and a second vehicles. For example, to apply the visual field support device according to the invention to the articulated bus, the processing described above may be performed by considering the first and second vehicles in the articulated bus as the tractor 21 and trailer 22 described above.

The tire described in regard to the vehicle composed of the tractor 21 and the trailer 22 is a ring formed of rubber or the like surrounding the wheel rim of the vehicle. In a case where a portion classified as a tire is not provided in the connected vehicle to which the visual field support device according to the invention is applied, the tires described above may be considered as a wheel.

What is claimed is:

1. An image processor receiving photographing signals from a first photographing part and a second photographing part installed at a first vehicle and having a common visual field in a direction of a second vehicle connected to the first vehicle, the image processor comprising:
    an image synthesizer generating a synthetic image obtained by synthesizing a first image based on the photographing signal from the first photographing part and a second image based on the photographing signal from the second photographing part; and
    a video signal output part outputting a video signal for displaying on a display device a display image based on the synthetic image.

2. The image processor according to claim 1,
    wherein, when the first and second vehicles lie on a straight line, the first photographing part and the second photographing part are installed at the first vehicle so that a left side of the second vehicle and a wheel or tire of the second vehicle fall in a visual field of the first photographing part and also so that a right side of the second vehicle and the wheel or tire of the second vehicle fall in a visual field of the second photographing part,
    wherein at least the wheel or tire of the second vehicle is included in the common visual field; and
    wherein the image synthesizer generates in the synthetic image at least an image of the wheel or tire of the second vehicle as a partial image corresponding to the common visual field.

3. The image processor according to claim 1,
    wherein the image synthesizer compares luminance of each pixel in an image region corresponding to the common visual field in the first image and luminance of each pixel in an image region corresponding to the common visual field in the second image, and generates a partial image corresponding to the common visual field in the synthetic image by using a pixel signal of the pixel with the larger luminance.

4. The image processor according to claim 1, wherein the image synthesizer comprises a portion detector detecting a position of a particular portion of the second vehicle on the first and second images, and synthesizes the first and second images based on a result of the detection made by the portion detector.

5. The image processor according to claim 1, further comprising a connecting angle detector for detecting a connecting angle formed by the first and second vehicles, wherein the image synthesizer synthesizes the first and second images based on the detected connecting angle.

6. A vehicle surrounding visual field support device, comprising:
the image processor according to claim 1, and
at least one of a photographing unit having the first and second photographing parts, and the display device.

7. A vehicle comprising a first vehicle and a second vehicle connected to the first vehicle, wherein the image processor according to claim 1 and the first and second photographing parts are installed.

8. An image processor receiving photographing signals from a first photographing part and a second photographing part installed at a first vehicle and having a common visual field in a direction of a second vehicle connected to the first vehicle, and also receiving a photographing signal from a third photographing part that photographs rear of the second vehicle, the image processor comprising:
an image synthesizer reflecting a third image based on the photographing signal from the third photographing part on an image portion of the second vehicle in a synthetic image obtained by synthesizing a first image based on the photographing signal from the first photographing part and a second image based on the photographing signal from the second photographing part and further synthesizing the synthetic image with the third image to thereby generate a multiple synthetic image; and
a video signal output part outputting a video signal for displaying on a display device a display image based on the multiple synthetic image.

9. A vehicle surrounding visual field support device, comprising:
the image processor according to claim 8,
at least one of a photographing unit having the first, second, and third photographing parts, and the display device.

10. A vehicle comprising a first vehicle and a second vehicle connected to the first vehicle,
wherein the image processor according to claim 8, and the first, second, and third photographing parts are installed.

11. The image processor according to claim 8, wherein the image synthesizer compares luminance of each pixel in an image region corresponding to the common visual field in the first image and luminance of each pixel in an image region corresponding to the common visual field in the second image, and generates a partial image corresponding to the common visual field in the synthetic image by using a pixel signal of the pixel with the larger luminance.

12. The image processor according to claim 8, wherein the image synthesizer comprises a portion detector detecting a position of a particular portion of the second vehicle on the first and second images, and synthesizes the first and second images based on a result of the detection made by the portion detector.

13. The image processor according to claim 8, further comprising a connecting angle detector for detecting a connecting angle formed by the first and second vehicles, wherein the image synthesizer synthesizes the first and second images based on the detected connecting angle.

14. A vehicle surrounding visual field support method, receiving photographing signals from a first photographing part and a second photographing part installed at a first vehicle and having a common visual field in a direction of a second vehicle connected to the first vehicle,
synthesizing a first image based on the photographing signal from the first photographing part and a second image based on the photographing signal from the second photographing part to thereby generate a synthetic image, and
displaying on a display device a display image based on the synthetic image.

15. The vehicle surrounding visual field support method according to claim 14,
wherein luminance of each pixel in an image region corresponding to the common visual field in the first image and luminance of each pixel in an image region corresponding to the common visual field in the second image are compared, and a partial image corresponding to the common visual field in the synthetic image is generated by using a pixel signal of the pixel with the larger luminance.

16. The vehicle surrounding visual field support method according to claim 14,
wherein a position of a particular portion of the second vehicle on the first and second images is detected, and the first and second images are synthesized based on the detected position.

17. The vehicle surrounding visual field support method according to claim 14,
wherein a connecting angle formed by the first and second vehicles is detected, and the first and second images are synthesized based on the detected connecting angle.

18. A vehicle surrounding visual field support method, receiving photographing signals from a first photographing part and a second photographing part installed at a first vehicle and having a common visual field in a direction of a second vehicle connected to the first vehicle, and also receiving a photographing signal from a third photographing part that photographs rear of the second vehicle,
reflecting a third image based on the photographing signal from the third photographing part on an image portion of the second vehicle in a synthetic image obtained by synthesizing a first image based on the photographing signal from the first photographing part and a second image based on the photographing signal from the second photographing part and further synthesizing the synthetic image with the third image to thereby generate a multiple synthetic image; and
displaying on a display device a display image based on the multiple synthetic image.

19. The vehicle surrounding visual field support method according to claim 18,
wherein luminance of each pixel in an image region corresponding to the common visual field in the first image and luminance of each pixel in an image region corresponding to the common visual field in the second image are compared, and a partial image corresponding to the common visual field in the synthetic image is generated by using a pixel signal of the pixel with the larger luminance.

20. The vehicle surrounding visual field support method according to claim 18,
wherein a position of a particular portion of the second vehicle on the first and second images is detected, and the first and second images are synthesized based on the detected position.

21. The vehicle surrounding visual field support method according to claim 18,
wherein a connecting angle formed by the first and second vehicles is detected, and the first and second images are synthesized based on the detected connecting angle.

* * * * *